Figure 1:
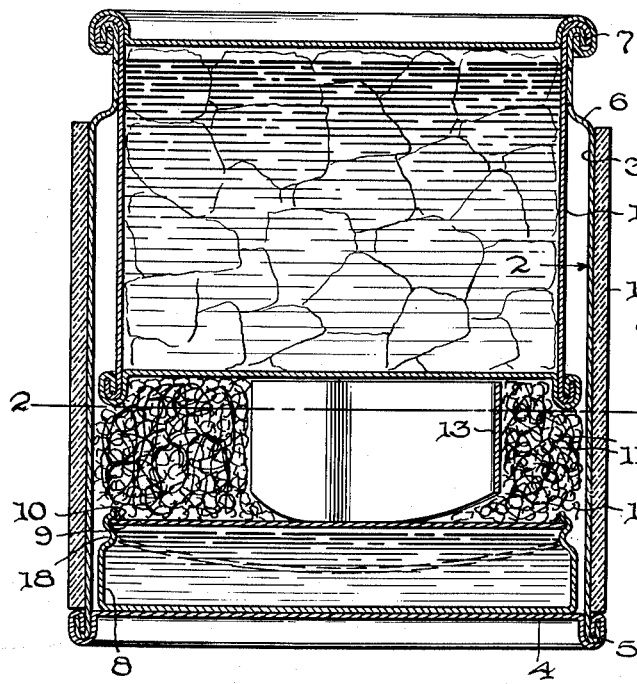

Dec. 30, 1952      L. SUKACEV      2,623,515

SELF-HEATING CONTAINER

Filed Dec. 29, 1950      2 SHEETS—SHEET 1

INVENTOR.
LEV SUKACEV
BY
Pennie Edmonds Morton & Barrows
ATTORNEYS

Dec. 30, 1952          L. SUKACEV          2,623,515

SELF-HEATING CONTAINER

Filed Dec. 29, 1950          2 SHEETS—SHEET 2

*INVENTOR.*
LEV SUKACEV
BY
Pennie Edmonds Morton Barrows
ATTORNEYS

Patented Dec. 30, 1952

2,623,515

UNITED STATES PATENT OFFICE 2,623,515

SELF-HEATING CONTAINER

Lev Sukacev, Washington, D. C.

Application December 29, 1950, Serial No. 203,371

18 Claims. (Cl. 126—263)

This invention relates to containers for soups, foods, beverages and the like, which are self-heating in that they embody a supply of an exothermic material, which when activated will liberate a sufficient amount of heat to bring the soup, etc. to a desired eating or drinking temperature. Such containers are particularly adapted for the storing of canned foods and the like which are to be used under conditions where the usual means for preparing hot meals are not readily available.

Containers contemplated by the present invention are of the self-contained type in that in addition to embodying a supply of the exothermic material they also embody a supply of water for activating the exothermic material when it is desired to place the container in operation for the purpose of heating the food, or the like.

The primary object of the invention is to provide a self-heating container of the kind referred to which is effectively sealed against ingress of atmospheric air, and in which the water to activate the exothermic material normally is maintained in a separate sealed container, but may be released therefrom for reaction with the exothermic material merely by the application of pressure to one end of the container. Other objects of the invention and the advantages thereof will appear from the accompanying drawings and the detailed description in connection therewith.

Figure 2:
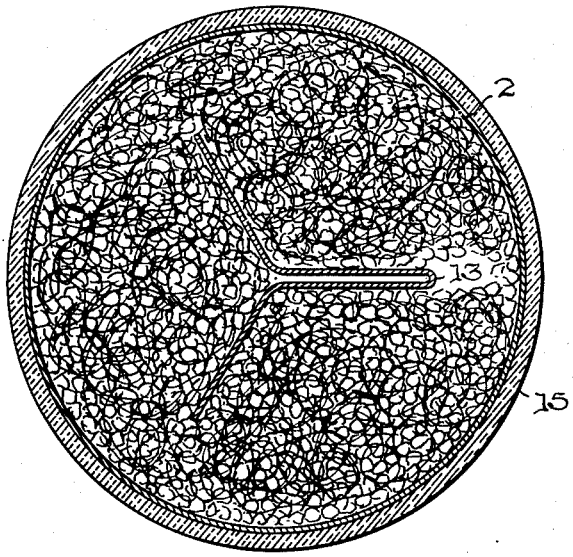

In the drawings:

Fig. 1 is a vertical sectional view of a self-heating container embodying the invention, Fig. 2 is a horizontal cross-sectional view on line 2—2 of Fig. 1.

Figure 3:
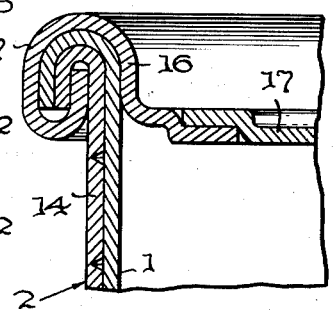
Figure 4:
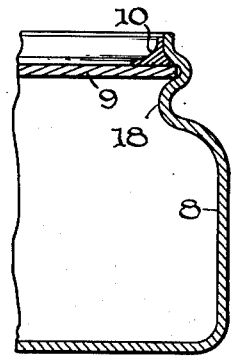
Figure 5:
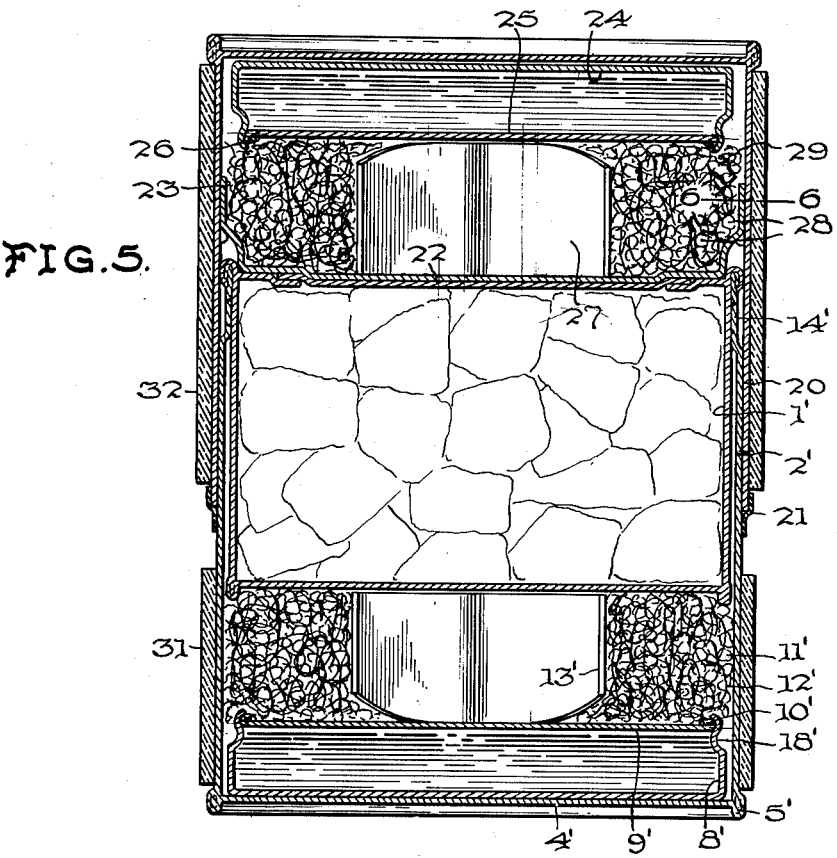
Figure 6:
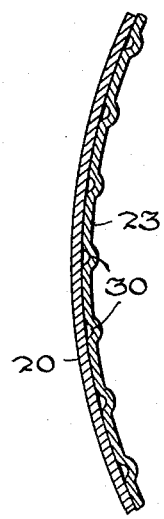

Fig. 3 is a detail sectional view illustrating the sealing means for the container, Fig. 4 is a detail sectional view showing the manner of sealing the water container of Fig. 1, Fig. 5 is a view similar to Fig. 1 of a form of self-heating container particularly adapted for heating solid or frozen foods, and Fig. 6 is a detail sectional view on line 6—6 of Fig. 5, with the outer insulating cylinder omitted.

Referring to the drawings, and first to the form of container illustrated in Figs. 1 to 4, the food, soup, beverage, etc., hereinafter characterized as "food" is hermetically sealed in a tinned or lacquered metal can 1 in accordance with the usual manner of canning foods. The food can 1 is contained within an outer receptacle 2 comprising side walls 3 and a bottom 4 crimp sealed thereto as at 5 but no independent top. The food container and outer receptacle may be round, square, or of any other desired shape.

The outer receptacle 2 is sufficiently larger than the food can, for the greater portion of the height of the side walls, to provide a slight space between the side walls thereof and the crimped seal at the bottom of the food can, for reasons which subsequently will appear.

The side walls 3 of the outer receptacle, adjacent their upper ends are bent inwardly, as at 6, so that the upper portions thereof tightly embrace the side walls of the food can.

The upper edges of the side walls of the outer receptacle and of the food can, and also the peripheral edge portion of the top of the food can are joined in a single hermetic seal, such as a crimp-seal 7.

A water container 8 is positioned on the bottom 4 of the outer receptacle and comprises a tray-like body and a top 9 which is mechanically held in place by grooving the side walls of the tray-like body, as shown in Fig. 4. The top 9 forms a rupturable closure for the water container. Leakage of water from the container is prevented by rubber or other sealing material 10.

The space between the water container and the bottom of the food container is filled with an exothermic material 11 which when reacted with water will liberate sufficient heat to raise the temperature of the food in the food container to a desired eating temperature. Any material which will react with water to liberate adequate heat may be used as the exothermic material, but burnt lime in granular form or mixtures containing burnt lime are preferred, since lime is cheap, readily available, easy to handle and on reaction with water liberates a large amount of heat. Since lime is a poor conductor of heat, and even more so after it has reacted with water and expanded into a spongy mass, I prefer to embed a mass of shavings 12 of aluminum, copper or other metal of good heat conductivity into the mass of the exothermic material. Such shavings will form paths of good heat conductivity from the central portion of the body of exothermic material to the bottom of the food can and thereby facilitate the heating of the food therein.

Also embedded in the body of the exothermic material is a pressure-transmitting member 13. This member advantageously may be formed from a single strip metal, plastic or the like, bent, as shown in Fig. 2, to provide three wing-like extensions, extending at substantially 120° from one another from a position at approximately the axis of the container. The member 13 rests on the top 9 of the water container 8 and is of such width as to extend therefrom substantially to the bottom of the food can. Its bottom edge is of such shape that it curves outwardly and upwardly from the central portion from which the wings radiate.

The upper portion of the side walls 3 which tightly embraces the side walls of the food container is formed with a removable sealing strip 14. The sealing strip is of a type commonly used in hermetically sealing cans of coffee and other foods, and may be removed with a suitable unwinding key. Removal of the sealing strip severs the connection between the food container and the outer receptacle and permits telescopic movement of the food can within the outer receptacle.

To prevent dissipation of heat, and protect the container from a possible surrounding cold atmosphere when the container is to be put into use, a cylinder 15 of fiber board, cardboard or other suitable insulating material is positioned about the outer receptacle. It may frictionally engage the side walls thereof and rest on the flange formed by the crimped seal 5.

If desired, the top of the food can may be formed of two parts, a peripheral annulus 16, the outer edge of which is simultaneously crimp-sealed to the upper edges of the food container and the outer container, and an inner disk portion 17 which is soldered at its edge portions to the inner periphery of the annulus 16. When the top of the food container is formed in this manner, the entire unit, except for the disk portion 17, may be assembled and furnished to the canner for filling, and the disk portion 17 then soldered to the annulus 16.

When the self-heating container is to be put into operation, the sealing strip 14 first is removed to permit relative movement of the food can in the outer receptacle. Pressure is then applied to the top of the container to cause movement of the food can inwardly of the outer receptacle. Such movement applies pressure to the member 13, which in turn is transmitted to the cover 9 of the water container. Due to the curved shape of the lower edges of the wings of the member 13, this pressure is exerted on the central portion of the cover, bulging it inwardly until the peripheral edge thereof is forced past the inward projection 18 formed by the grooving of the side walls of the water receptacle. As the cover is forced past the projection, it functions as a plunger to force the water from the water container into the body of the exothermic material with which it reacts to liberate sufficient heat to bring the food in the food container to the desired eating temperature.

The slight space between the crimp-seal at the bottom of the food can and the side walls 3 of the outer receptacle permits the passage of steam from the reacting material into the space between the side walls of the food can and the outer receptacle, thereby facilitating the heating of the food in the food can.

If the exothermic material is lime or a material containing lime, it will undergo substantial expansion during its reaction with water. Such expansion will exert a force on the bottom of the food can which will lift it relative to the outer receptacle. However, complete removal of the food can is prevented by the inwardly-bent portion 6 of the side walls which are engaged by the crimped flange at the bottom of the food can to limit further outward movement of the food can.

After a period sufficient to permit thorough heating of the contents of the food can, the top may be opened and the hot food eaten.

The form of self-heating container illustrated in Figs. 1 to 4 is particularly adapted for the heating of canned soups, beverages, or foods containing a large amount of liquid. Meat and other solid foods, and also frozen foods are much poorer conductors of heat. Therefore, when such foods are packaged it is desirable to provide additional means for supplying heat to the canned product. A form of self-heating container having such additional heating means is shown in Figs. 5 and 6. In accordance with this embodiment of the invention, I provide a self-heating container which in all respects is the same as that previously described, except that the food can is of greater diameter and of less height than that used for soups and other foods which contain a large amount of liquid. Such a self-heating container is shown in Fig. 5 and parts corresponding to those of the self-heating container of Fig. 1 are designated by the same reference characters, primed.

This self-heating container differs from that of Fig. 1 in that means are provided for heating the food can from both ends. For that purpose, an auxiliary unit embodying heating means similar to that previously described is placed over the upper end of the self-heating container.

The auxiliary heating means of Fig. 5 comprises a cover member 20 positioned on the upper end of the outer receptacle 2'. The side walls of the cover 20 are of such height that they overlap the side walls 2' for a substantial distance. Their lower edges are hermetically sealed to the side walls 2' by a rubber, plastic or other sealing strip 21.

The upper portion of the cover 20 is separated from the lower portion thereof by a transverse partition wall 22 of such contour as to conform to the shape of the top of the food can 1'. It has flanges 23 which lie against and are soldered to the side walls or flanges of the cover 20 sufficiently to temporarily hold it in place.

An inverted water container 24, similar to the water container 8', is placed at the upper portion of the space between the partition wall 22 and the top of the cover member 20. It is provided with a cover 25 which is mechanically held in place by grooving the side walls of the tray-like body thereof, and is sealed against leakage of water by a rubber or other sealing means 26.

A pressure-exerting member 27 is interposed between the partition wall 22 and the cover 25 of the water container. The pressure-exerting members 13' and 27 are identical with the pressure member 13 of Figs. 1 and 2 and the edges of the wings thereof which are in contact with the covers 9' and 25 curve outwardly away from the central portion thereof to centralize the pressure which they exert on the cover member when the ends of the container are forced towards one another.

The space surrounding the pressure member 27, between the partition wall 22 and the water container, is filled with exothermic material 28 of the same composition as that previously described. Metal shavings 29 of high heat conductivity are embedded in it for the purpose of facilitating the transfer of heat from the interior of the body of exothermic material to the top of the food can.

Preferably the flanges 23 are provided with slight longitudinal grooves or channels 30, as shown in Fig. 6, to permit the escape of steam during reaction of the exothermic material with the water.

In this embodiment of the invention, insulation is provided by a pair of insulating cylinders, a lower insulating cylinder 31, and an upper cylinder 32 which is substantially coextensive with the side walls or flanges of the cover member 20.

When the self-heating container of Fig. 5 is to be put into operation, the sealing strip 21 is removed and the auxiliary upper heating unit removed to give access to the sealing strip 14' which is then removed. The auxiliary unit is then replaced and sufficient pressure applied to the ends of the self-heating container to rupture the soldered connection between the flanges 23 and the cover 20 and to force the covers 9' and 25 into the water receptacles and to force the water in them into the respective bodies 11' and 28 of the exothermic material.

The tray-like shape of the partition 22 prevents any water or exothermic material from falling into the space occupied by the food can, and the grooves or channels 30 permit the escape of steam to such space to facilitate the heating of the food can.

After a sufficient period of heating, the auxiliary top heating means is removed and the food can opened in the usual manner.

From the foregoing, it will be apparent that the present invention provides a self-heating container which requires no puncturing tools to bring the water into contact with the exothermic material for reaction therewith. Also, the food can may be of the type commonly used for the canning of foods, and its heating to the desired temperature may be obtained at less extra cost than in other known self-heating containers.

Various changes may be made in the details of the structure of the self-heating containers without departing from the scope of the invention or sacrificing any of the advantages thereof.

I claim:

1. A self-heating container comprising an outer receptacle, a food can in the outer receptacle, a container of water between one end of the food can and one end of the outer receptacle, said water container having a rupturable portion, exothermic material which will react with water to liberate heat between said end of the food can and said end of the outer receptacle, and a pressure-transmitting member between the food can and said end of the outer receptacle, said pressure-transmitting member bearing against said rupturable portion of the water container, whereby when a force is applied to the food can in a direction tending to move it towards said end of the outer receptacle, the pressure-transmitting member will rupture said rupturable portion of the water container to permit passage of water therefrom for reaction with the exothermic material.

2. A self-heating container as defined in claim 1 in which the pressure-transmitting member is positioned between the food can and the water container.

3. A self-heating container as defined in claim 1 in which the rupturable portion of the water container is a closure therefor mechanically retained in place.

4. A self-heating container as defined in claim 3 in which the pressure-transmitting member is positioned centrally of the closure of the water container.

5. A self-heating container as defined in claim 4 in which the pressure-transmitting member comprises a plurality of spaced radiating wings.

6. A self-heating container as defined in claim 1 in which the rupturable portion of the water container is a closure therefor mechanically retained in place, the pressure-transmitting member is positioned centrally of the closure, and the side of the pressure-transmitting member adjacent the closure is of such shape that it contacts the central portion of the closure and then curves away therefrom.

7. A self-heating container as defined in claim 1 in which the side walls of the food can are spaced from the side walls of the outer receptacle to provide a space for steam generated during reaction of the water with the exothermic material.

8. A self-heating container comprising an outer receptacle, a food can in the outer receptacle, a container of water between one end of the food can and one end of the outer receptacle, a closure for said water container, exothermic material which will react with water to liberate heat between said end of the food can and said end of the outer receptacle, and means for causing water in the water container to be brought into contact with the exothermic material, the upper edge portions of the side walls of the outer receptacle having a watertight seal with the food can, said means for causing the water in the water container to be brought into contact with the exothermic material comprising a rupturable portion of the water container and a pressure-transmitting member bearing against said rupturable portion, whereby when a force is applied to the food can in a direction tending to move it towards said end of the outer receptacle, the pressure-transmitting member will rupture said rupturable portion of the water container to permit passage of water therefrom for reaction with the exothermic material.

9. A self-heating container as defined in claim 8 in which the pressure-transmitting member is positioned between the food can and the water container.

10. A self-heating container as defined in claim 8 in which the closure for the water container is rupturable and is mechanically retained in place.

11. A self-heating container as defined in claim 8 in which the pressure-transmitting member bears against the central portion of the closure for the water container.

12. A self-heating container as defined in claim 1 in which a like water-container, exothermic material and pressure-transmitting member are positioned between the other end of the food can and the other end of the outer container.

13. A self-heating container as defined in claim 12 in which a partition separates the exothermic material, the water container and the pressure-transmitting member at said other end of the food can from the food can.

14. A self-heating container as defined in claim 13 in which the partition is of tray-like form having flanges secured to the side walls of the outer receptacle, and said flanges are provided on their outer surfaces with grooves to permit escape of steam.

15. A self-heating container as defined in claim 1 in which removable auxiliary heating means is applied to the other end of the food can and such removable means comprises an enclosing member for the upper portion of the outer receptacle, which enclosing member includes like exothermic material, water container and pressure-transmitting member.

16. A self-heating container as defined in claim 8 in which a like water-container, exothermic material and pressure-transmitting member are positioned between the other end of the food can and an enclosing member for the other end of the outer container.

17. A self-heating container as defined in claim 16 in which a partition separates the exothermic material, the water container and the pressure-transmitting member at said other end of the food can from the food can.

18. A self-heating container as defined in claim 8 in which removable auxiliary heating means is applied to the other end of the food can and such removable means comprises an enclosing member for the upper portion of the outer receptacle, which enclosing member includes like exothermic material, water container and pressure-transmitting member.

LEV SUKACEV.

REFERENCES CITED

The following references are of record in the file of this patent:

UNITED STATES PATENTS

| Number | Name | Date |
|---|---|---|
| 654,174 | Murmann et al. | July 24, 1900 |
| 720,434 | Jewett | Feb. 10, 1903 |
| 820,638 | Gabriel | May 15, 1906 |
| 1,306,808 | Ford | June 17, 1919 |
| 2,036,611 | Simmons | Apr. 7, 1936 |
| 2,288,895 | Fink | July 7, 1942 |
| 2,300,793 | Martin | Nov. 3, 1942 |
| 2,327,447 | O'Brien | Aug. 24, 1943 |